Bargis & Underwood,
Fruit Jar.
No. 97,588. Patented Dec. 7, 1869.
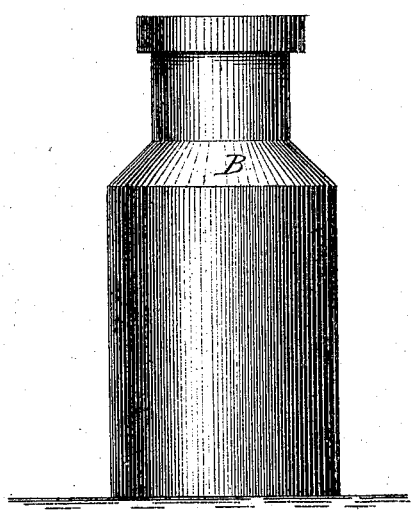
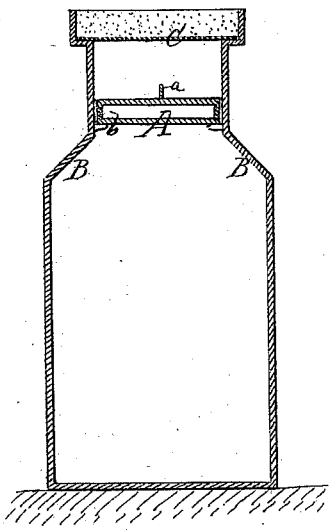
Attest
C. F. Clausen
A. Ruppert.
Bargis & Underwood
Inventors
D. P. Holloway & Co
Attys

United States Patent Office.

THOMAS J. BARGIS AND JOHN C. UNDERWOOD, OF RICHMOND, INDIANA.

Letters Patent No. 97,588, dated December 7, 1869.

IMPROVEMENT IN FRUIT-JARS.

The Schedule referred to in these Letters Patent and making part of the same.

*To all whom it may concern:*

Be it known that we, THOMAS J. BARGIS and JOHN C. UNDERWOOD, both of Richmond, in the county of Wayne, and State of Indiana, have invented a new and useful Improvement in Fruit-Jars; and we do hereby declare that the following is a full, clear, and exact description thereof, reference being had to the annexed drawings, making part of this specification, in which—

Figure 1 is an elevation, and
Figure 2 is a vertical section.

This invention relates to cans or jars for preserving of fruits and vegetables; and It consists in constructing such cans or jars with a continuous ledge, or with a series of projections, placed at intervals, upon the inside of the neck of such jars or cans, to receive and support a float, which is made to move up and down in said neck, for the purpose of keeping the solid portions of the contents below the surface of the liquid; and It further consists in the arrangement of the float with reference to the ledge or projections and the cover of the jar, as will be more fully described hereinafter.

To enable those skilled in the art to make and use our invention, we will proceed to describe its construction and operation.

B represents a can or jar, which may be made of glass, earthenware, sheet-tin, or of any other suitable material. It should be substantially of the form shown in the drawings, and of any desired capacity.

The neck or contracted portion of this can, at its lower portion, at near the point where it joins the enlarged portion, is to be provided with a continuous inwardly-projecting ledge, or with projections, *b*, for the float A to rest upon, as shown in fig. 2 of the drawings.

The float A, above alluded to, is, by preference, to be made of glass, and hollow, as shown, so that it may have a tendency to float upon the liquid in the vessel, but so that, at the same time, it will press downward upon the solid contents of the jar with sufficient force to keep them below the surface of the liquid.

The diameter of this float is to be such, that when inserted in the jar, it will leave a small space between it and the neck thereof, so that, as it settles down upon the solid contents of the same, the liquid will rise around it, and thus insure the object sought to be obtained.

For convenience, in removing from the jar, when desirable, a small projection is formed upon the upper surface of this float, which serves as a handle for that purpose.

The upper portion of the neck of the jar is provided with an enlargement, formed by carrying the wall of the jar outward, in a horizontal position, for a short distance, and then upward, in a vertical line, for a distance sufficient to form a receptacle for the permanent cover, which may be of any approved form of construction, and be secured with sealing-wax, or in any other approved manner.

We are aware that weights have been used in vessels in which meats have been preserved, for the purpose of keeping the same below the brine; and also, that jars and crocks, of earthenware, have been constructed with disks, of the same material, made to fit their interior surfaces, so that as the material, or a portion of it, was removed from such jar, said disk would settle down and press the remaining solid portions below the liquid.

Our invention differs from all these, in that it is designed to operate only when the can or jar is first filled, or until some or all of the contents of the jar are removed; and as it is limited in its movement by the ledge and projections on the bottom, and by the permanent cover on the top, it can never fail to perform its function, so long as the can is filled; neither can it drop down into the enlarged portion of the can, and thus injure the contents, or permit them to be injured by any substance which may fall in, in unsealing and removing the permanent cover.

Having thus described our invention,

What we claim, and desire to secure by Letters Patent, is—

1. The construction of a fruit-jar or can with a continuous ledge, or its equivalent, around the lower portion of the interior of the neck of the same, to receive the float, and arrest its movement in a downward direction, as described.

2. The arrangement of the hollow float A, with reference to the ledge or projections *b*, and the permanent cover C, it being such that the movements of said float are controlled thereby, in the manner and for the purpose set forth.

In testimony whereof, we have signed our names to this specification, in the presence of two subscribing witnesses.

THOS. J. BARGIS.
JNO. C. UNDERWOOD.

Witnesses:
JOHN H. POPP,
CHARLES T. SEAMAN.